United States Patent [19]

Breitenfellner

[11] Patent Number: 4,521,560

[45] Date of Patent: Jun. 4, 1985

[54] THERMOPLASTIC POLYESTER MOULDING COMPOSITION CONTAINING FLAME RETARDANT AND MAGNESIUM SULFATE

[75] Inventor: Franz Breitenfellner, Bensheim, Fed. Rep. of Germany

[73] Assignee: Ciba Geigy Corporation, Ardsley, N.Y.

[21] Appl. No.: 509,502

[22] Filed: Jun. 30, 1983

Related U.S. Application Data

[63] Continuation of Ser. No. 378,300, May 14, 1982, abandoned.

[30] Foreign Application Priority Data

May 25, 1981 [CH] Switzerland ............... 3406/81

[51] Int. Cl.³ .................. C08K 3/30; C08K 5/06
[52] U.S. Cl. ..................... 524/371; 524/423
[58] Field of Search ................. 524/423, 371

[56] References Cited

U.S. PATENT DOCUMENTS

| | | | |
|---|---|---|---|
| T900,007 | 7/1972 | Neal | 8/168 |
| 3,368,995 | 2/1968 | Furukawa et al. | 524/423 |
| 3,516,957 | 6/1970 | Gray et al. | 260/22 |
| 3,953,565 | 4/1976 | Mizutani et al. | 524/423 |
| 4,000,109 | 12/1976 | Smith et al. | 260/40 R |
| 4,043,971 | 8/1977 | Wurnb et al. | 260/40 R |
| 4,052,356 | 10/1977 | Breitenfellner et al. | 260/40 R |

FOREIGN PATENT DOCUMENTS 45-3887 2/1970 Japan.
763404 9/1980 U.S.S.R..

OTHER PUBLICATIONS

CA 73 (1970), 26533h.

*Primary Examiner*—Veronica P. Hoke
*Attorney, Agent, or Firm*—Luther A. R. Hall

[57] ABSTRACT

The invention relates to moulding compositions based on thermoplastic polyesters and containing finely particulate calcined magnesium sulfate. The moulded articles obtained with these compositions have increased stiffness and tracking resistance, this latter also in the presence of flame retardants and/or a reinforcing filler.

10 Claims, No Drawings

THERMOPLASTIC POLYESTER MOULDING COMPOSITION CONTAINING FLAME RETARDANT AND MAGNESIUM SULFATE

This is a continuation of application Ser. No. 378,300, filed on May 14, 1982, now abandoned.

The present invention relates to a thermoplastic polyester moulding composition which contains calcined magnesium sulfate and, optionally, reinforcing fillers, flame retardants and other conventional additives, and to the use of said composition for the production of moulded articles.

Thermoplastic polyesters are valuable moulding compounds which are widely used in the art. In order to satisfy different end uses, it is usual to add fillers to the polyesters, with which fillers specific mechanical and electrical properties can be improved. To increase the dimensional stability under heat and stiffness there may be added fillers such as glass fibres, while flame retardants may be added to diminish combustibility. These additives, however, diminish the tracking resistance, which is an important property for utilities in the electrical field.

Fillers for improving the tracking resistance are already known, e.g. kaolin (German Offenlegungsschrift No. 2 616 754), calcium or barium sulfate (German Offenlegungsschrift No. 2 524 121) and metal borates (German Offenlegungsschrift No. 2 534 762).

It is the object of the present invention to provide thermoplastic polyester moulding compositions which have improved stiffness and tracking resistance.

Accordingly, the invention provides a thermoplastic polyester moulding composition and comprising, based on the total composition,
(a) 40 to 97% by weight of a thermoplastic polyester,
(b) 3 to 60% by weight of finely particulate calcined magnesium sulfate, and
(c) optionally further conventional additives.

Linear thermoplastic polyesters suitable for the moulding materials of the invention are preferably crystalline or fine-crystalline and thus have, in particular, a melting point of at least 150° C. However, they may also be amorphous, in which case the polyester then preferably has a glass transition temperature of at least 70° C., most preferably of at least 100° C. The intrinsic viscosity of the polyesters is preferably at least 0.6 dl/g, most preferably at least 0.8 dl/g.

The polyesters may be homopolymers or copolymers which are derived from aliphatic, cycloaliphatic or aromatic dicarboxylic acids and diols or hydroxycarboxylic acids. Mixtures of these polyesters are also suitable. Their composition depends substantially on the desired properties for a specific end use.

The aliphatic dicarboxylic acids may contain 2 to 40 carbon atoms, the cycloaliphatic dicarboxylic acids 6 to 10 carbon atoms, the aromatic dicarboxylic acids 8 to 14 carbon atoms, the aliphatic hydroxycarboxylic acids 2 to 12 carbon atoms, and the aromatic and cycloaliphatic hydroxycarboxylic acids 7 to 14 carbon atoms.

The aliphatrc diols may contain 2 to 12 carbon atoms, the cycloaliphatic diols 5 to 8 carbon atoms and the aromatic diols 6 to 16 carbon atoms. By aromatic diols are meant those in which two hydroxyl groups are linked to one aromatic hydrocarbon radical or to different aromatic hydrocarbon radicals.

Further, the polyesters may also be branched with small amounts, e.g. 0.1 to 3 mol. %, based on the dicarboxylic acids, of more than bifunctional monomers (e.g. pentaerythritol or trimellitic acid).

Polyesters consisting of at least three monomers may contain these in statistical distribution or they may be block polymers.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing 2 to 40 carbon atoms, e.g. oxalic acid, malonic acid, dimethylmalonic acid, succinic acid, octadecylsuccinic acid, pimelic acid, adipic acid, trimethyladipic acid, sebacic acid, azelaic acid, and dimeric acids (dimerisation products of unsaturated aliphatic carboxylic acids, such as oleic acid), alkylated malonic and succinic acids, such as octadecylsuccinic acid.

Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxyrethylcyclohexane, 4,4'-dicyclohexyldicarboxylic acid.

Examples of suitable aromatic dicarboxylic acids are: in particular terephthalic acid, isophthalic acid, o-phthalic acid, as well as 1,3-, 1,4-, 2,6- or 2,7-naphthalenedicarboxylic acid, 4,4'-diphenyldicarboxylic acid, 4,4'-diphenylsulfone-dicarboxylic acid, 1,1,3-trimethyl-5-carboxy-3-(p-carboxyphenyl)indane, 4,4'-diphenyl ether dicarboxylic acid and bis-p-(carboxyphenyl)methane.

The aromatic dicarboxylic acids are preferred, with terephthalic acid, isophthalic acid and orthophthalic acid being particularly preferred.

Further suitable dicarboxylic acids are those which contain —CO—NH— groups. They are described e.g. in German Offenlegungsschrift No. 2 414 349. Dicarboxylic acids which contain N-heterocyclic rings are also suitable, for example those which are derived from carboxyalkylated, carboxyphenylated or carboxybenzylated monoamino-s-triazinedicarboxylic acids (cf. German Offenlegungsschrift specifications Nos. 2 121 184 and 2 533 675), mono- or bishydantoins, unsubstituted or halogenated benzimidazolones, or parabanic acid. The carboxyalkyl group may contain 3 to 20 carbon atoms.

Suitable aliphatic diols are the linear and branched aliphatic glycols, in particular those containing 2 to 12, especially 2 to 6, carbon atoms in the molecule, for example: ethylene glycol, 1,2- or 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is e.g. 1,4-dihydroxycyclohexane.

Further suitable aliphatic diols are e.g. 1,4-dihydroxymethylcyclohexane, aromatic-aliphatic diols, such as p-xylylene glycol or 2,5-dichloro-p-xylylene glycol, 2,2-(β-hydroxyethoxyphenyl)propane, and polyoxyalkylene glycols such as diethylene glycol, triethylene glycol or polyethylene glycol. The alkylenediols are preferably linear and contain preferably 2 to 4 carbon atoms.

Preferred diols are 1,4-dihydroxycyclohexane and 1,4-dihydroxymethylcyclohexane. Ethylene glycol and 1,4-butanediol are particularly preferred.

Further suitable aliphatic diols are the β-hydroxyalkylated, especially β-hydroxyethylated, bisphenols such as 2,2-bis-[4'-(β-hydroxyethoxy)phenyl]propane. Further bisphenols are mentioned later.

A further group of suitable aliphatic diols comprises the heterocyclic diols described in German Offenlegungsschrift specifications Nos. 1 812 003, 2 342 432, 2 342 372 and 2 453 326. Examples are:

N,N'-bis-(β-hydroxyethyl-5,5-dimethyl)hydantoin, N,N'-bis-(β-hydroxypropyl-5,5-dimethyl)hydantoin, methylene-bis-[N,N'-(β-hydroxyethyl)-5-methyl-5-ethylhydantoin], methylene-bis-[N-(β-hydroxyethyl)-5,5-dimethylhydantoin], N,N'-bis-(β-hydroxyethyl)benzimidazolone, -(tetrachloro)benzimidazolone or -(tetrabromo)benzimidazolone.

Suitable aromatic diols are mononuclear diphenols and, in particular, binuclear diphenols which carry a hydroxyl group at each aromatic nucleus. Aromatic will be understood to mean aromatic hydrocarbon radicals such as phenylene or naphthylene. In addition e.g. to hydroquinone, particular mention is to be made of those bisphenols which may be illustrated by the following formula

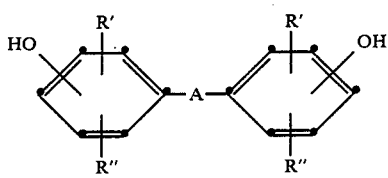

in which the hydroxyl groups may be in the meta-position, but preferably in the para-position, R' and R" may be alkyl of 1 to 6 carbon atoms, halogen such as chlorine or bromine and, in particular, hydrogen, A can be a direct bond or is O, S, SO$_2$, unsubstituted or substituted alkylidene, cycloalkylidene or alkylene.

Unsubstituted or substituted alkylidene is e.g.: ethylidene, 1,1- or 2,2-propylidene, 2,2-butylidene, 1,1-isobutylidene, pentylidene, hexylidene, heptylidene, octylidene, dichloroethylidene and trichloroethylidene.

Unsubstituted or substituted alkylene is e g.: methylene, ethylene, phenylmethylene, diphenylmethylene, methylphenylmethylene. Unsubstituted or substituted cycloalkylidene is e.g.: cyclopentylidene, cyclohexylidene, cycloheptylidene and cyclooctylidene.

Examples of bisphenols are: bis-(p-hydroxyphenyl) ether or thioether, bis-(p-hydroxyphenyl)sulfone, bis-(p-hydroxyphenyl)methane, 1,2-bis-(p-hydroxyphenyl)ethane, 1-phenyl-bis-(p-hydroxyphenyl)methane, diphenyl-bis-(p-hydroxyphenyl)methane, diphenyl-bis-(p-hydroxyphenyl)methane, 2,2-bis-(4'-hydroxy-3'-dimethylphenyl)propane, 1,1- or 2,2-bis-(p-hydroxyphenyl)butane, 1,1-dichloro- or 1,1,1-trichloro-2,2-bis-(p-hydroxyphenyl)ethane, 1,1-bis-(p-hydroxyphenyl)cyclopentane and, in particular, 2,2-bis-(p-hydroxyphenyl)propane (bisphenol A) and 1,1-bis-(p-hydroxyphenyl)cyclohexane (bisphenol C).

Suitable polyesters of hydroxycarboxylic acids are e.g.: polycaprolactone, polypivalolactone or the polyesters of 4-hydroxycyclohexanecarboxylic acid or 4-hydroxybenzoic acid.

Polyesters with aromatic dicarboxylic acids have attained the greatest importance, especially the polyalkylene terephthalates. Preferred moulding compositions of this invention are therefore those in which the polyester consists of at least 30 mol. %, preferably at least 40 mol. %, of aromatic dicarboxylic acids and at least 30 mol. %, preferably at least 40 mol. %, of alkylenediols containing preferably 2 to 12 carbon atoms, based on the polyester.

In this case the alkylenediol is in particular linear and contains 2 to 6 carbon atoms, e.g. ethylene glycol, triethylene glycol, tetraethylene glycol or hexamethylene glycol, and the aromatic dicarboxylic acid is terephthalic acid and/or isophthalic acid. Particularly preferred polyesters are polyethylene and poly-1,4-butylene terephthalate and also copolyesters based on polyethylene terephthalate and poly-1,4-butylene terephthalate.

The moulding composition of the invention can additionally contain a reinforcing (fibrous) filler, e.g. asbestos fibres, carbon fibres or, in particular, glass fibres. The total amount of reinforcing filler and calcined magnesium sulfate is at most 60% by weight, based on the total composition. The fillers, including calcined magnesium sulfate, can be coated with an adhesion promoter in order to bind them better to the polyester.

The moulding composition of the invention may additionally contain 3 to 25% by weight, preferably 8 to 20% by weight, based on the polyester, of a flame-proofing additive.

Examples of suitable flame-proofing additives are organic halogen compounds, especially chlorine or bromine compounds, which are used by themselves or together with synergistic compounds of the 5th main group of the Periodic Table, preferably phosphorus and antimony compounds, most preferably antimony trioxide.

Flame retardants based on organic chlorine-containing and/or bromine-containing compounds are known. They may be compounds which are incorporated in the plastics material as mixture component, or compounds which, as reactive monomers, are built into the polymer molecule. Examples of these last-mentioned compounds are tetrachlorophthalic anhydride, dichlorotetraphthalic acid or the lower alkyl esters thereof, tetrabromophthalic anhydride, tetrabromobisphenol A, N,N'-bis(β-hydroxyethyl)tetrachloro- or tetrabromobenzimidazolone.

Further examples of chlorine-containing and/or bromine-containing compounds are: polytribromostyrene, polypentabromostyrene, decabromodiphenyl, tetrabromodiphenyl, hexabromodiphenyl ether, octabromodiphenyl ether, decabromodiphenyl ether, tetrabromodiphenyl sulfide, hexabromodiphenylsulfone, 3-(2',4',6'-tribromophenoxy)-1,2-propanedio, di- or tetrabromophthalic acid and anhydrides thereof, dibromoterephthalic acid, hydroxyethylated dibromo- or tetrabromobisphenyl A, tetrabromo-1,4-(dihydroxymethyl)benzene, tetrabromobenzimidazolone, N,N'-alkylene-bis-tetrabromophthalimide as well as the chlorine-containing analogs. Further halogen-containing compounds are described e.g. in German Offenlegungsschrift No. 2 242 450.

In a preferred embodiment of the invention, the moulding composition contains 3 to 40% by weight, preferably 10 to 30% by weight, of calcined magnesium sulfate, or 3 to 40% by weight of calcined magnesium sulfate and 5 to 57% by weight of glass fibres.

The magnesium sulfate employed in the practice of this invention is principally finely ground calcined magnesium sulfate which may have e.g. a particle size of 1 μm to 100 μm. The water of crystallisation is removed by the calcination at least to such an extent that there need be no fear of hydrolytic degradation when the magnesium sulfate is incorporated in the polyester.

The thermoplastic polyesters are known and commercially available, or they can be obtained by polycondensation methods known and employed in the art.

The moulding compositions of the invention are also obtained by methods conventionally employed in the art, by incorporating the additives in the polyester during or after the polycondensation by adding them to the reaction mass or by regranulating existing granules from the melt state.

Further conventional ingredients may also be added, e.g. further fillers such as talcum, mica, metal powder, silica aerosol or glass beads, inorganic and organic pigments, fluorescent whitening agents, dulling agents, lubricants, mould release agents, crystallisation promoters, antioxidants, light stabilisers and processing stabilisers.

The moulding compositions of the invention have a clear inherent colour and so make it easier to effect coloration with pigments. They have increased stiffness and tracking resistance. Flame-proofed moulding compositions or moulding compositions containing reinforcing fillers have a greatly improved tracking resistance. In addition, the moulding compositions have excellent toughness properties. Surprisingly, the tendency of reinforced flame-proofed moulding compositions to drip when subjected to burning is also inhibited.

The moulding compositions can be processed to articles of daily use of all kinds by conventional methods such as casting, compression moulding, injection moulding and extruding. Examples of such articles are industrial apparatus parts, apparatus casings, household appliances, sporting goods, electrical insulations, automobile parts, circuits, boards, films and semifinished products which can be shaped by machining. Owing to the good electrical properties, a particular utility is the manufacture of moulded articles for the electrical field.

The following Examples illustrate the invention in more detail.

EXAMPLES 1 and 2

Calcined $MgSO_4$, in the amounts indicated in Table 1, is incorporated in polybutylene terephthalate using a laboratory kneader at a cylinder temperature of 250° C., and the moulding composition so obtained is granulated. The polybutylene terephthalate employed has a viscosity number of 147 $cm^3/g$ according to DIN 53 728/3. After the granules have been dried they are processed to test articles by injection moulding under the following conditions: cylinder temperature 250° C., mould temperature 80° C., cycle time 45 sec. The moulded articles are tested for the properties indicated in the following table.

The moulded articles have excellent tracking resistance and a high modulus of elasticity (stiffness).

EXAMPLE 3

30% by weight of calcined $MgSO_4$ are incorporated in similar manner in 70% by weight of polybutylene terephthalate (viscosity number: 135 $cm^3/g$ according to DIN 53 728/3) which contains 11% by weight of decabromodiphenyl oxide and 5.5% by weight of $Sb_2O_3$, based on the polymer. Moulded articles obtained by injection moulding are once more tested for their properties and the results are reported in the table. In self-extinguishing orientation (V-2), the moulded articles have excellent tracking resistance as well as excellent stiffness.

EXAMPLE 4

Using a laboratory Ko-kneader, 20% by weight of glass fibres and 30% by weight of calcined $MgSO_4$ are incorporated in the same manner in 50% by weight of polybutylene terephthalate (viscosity number: 110 $cm^3/g$). The properties of moulded articles obtained by injection moulding are determined and reported in the table. These moulded articles too have excellent tracking resistance and stiffness.

EXAMPLE 5

20% by weight of glass fibres and 30% by weight of calcined $MgSO_4$ are incorporated in the same manner in 50% by weight of polybutylene terephthalate (viscosity number according to DIN 53 728/3: 110 $g/cm^3$) which contains, based on the polymer, 11% by weight of decabromodiphenyl oxide and 5.5% by weight of $Sb_2O_2$. The properties of moulded articles obtained by injection moulding are determined and reported in the table.

In this case too the electrical properties and stiffness are good. In the Flame Propagation Test, UL Subject 94, $MgSO_4$ also reduces dripping, and an improvement in the flameproofing action is observed in glass reinforced moulded articles.

| Example | Composition | Tracking resistance DIN 53480 (volts) Method KB | Tracking resistance DIN 53480 (volts) Method KC | Modulus of elasticity DIN 53457 ($N/nm^2$) | Flammability UL 94 |
|---|---|---|---|---|---|
| 1 | 95% by weight of PBTP<br>5% by weight of calcined $MgSO_4$ | 425 | >600 | 3000 | |
| 2 | 80% by weight of PBTP<br>20% by weight of calcined $MgSO_4$ | 550 | >600 | 3500 | |
| 3 | 70% by weight of PBTP containing 11% by weight of decabromodiphenyl oxide + 5.5% by weight of $Sb_2O_3$, based on the polymer<br>30% by weight of calcined $MgSO_4$ | 250 | 425 | 5600 | V-2 dripping |
| 4 | 50% by weight of PBTP<br>20% by weight of glass fibres<br>30% by weight of calcined $MgSO_4$ | 375 | >600 | 10500 | |
| 5 | 50% by weight of PBTP containing 11% by weight of decabromodiphenyl oxide + 5.5% by weight of $Sb_2O_3$, based on the polymer<br>20% by weight of glass fibres<br>30% by weight of calcined $MgSO_4$ | 225 | 475 | 12900 | V-0 non-dripping |

PBTP = polybutylene terephthalate

What is claimed is:

1. A thermoplastic polyester moulding composition which comprises, based on the total composition, (a) 40 to 95% by weight of a thermoplastic polyester,
(b) 5 to 60% by weight of finely particulate calcined magnesium sulfate, and
(c) 3 to 25% by weight, based on the polyester, of a flame-proofing additive, which is a mixture of decabromodiphenyl oxide and antimony trioxide.

2. A moulding composition according to claim 1, wherein the polyester is a polyalkylene terephthalate.

3. A moulding composition according to claim 2, wherein the polyester is a polyethylene terephthalate or poly-1,4-butylene terephthalate or a copolyester based on polyethylene terephthalate or poly-1,4-butylene terephthalate.

4. A moulding composition according to claim 1, which contains 5 to 40% by weight of calcined magnesium sulfate.

5. A thermoplastic polyester moulding composition which comprises, based on the total composition,
(a) 40 to 95% by weight of a thermoplastic polyester,
(b) 5 to 60% by weight of finely particulate calcined magnesium sulfate, and
(c) a reinforcing filler which is selected from the group consisting of glass fibers and kaolin, such that the amount of filler and calcined magnesium sulfate is at most 60% by weight, based on the total composition, and
(d) 3 to 25% by weight, based on the polyester, of a flame-proofing additive, which is a mixture of decabromodiphenyl oxide and antimony trioxide.

6. A moulding composition according to claim 5, wherein the polyester is a polyalkylene terephthalate.

7. A moulding composition according to claim 6, wherein the polyester is a polyethylene terephthalate or poly-1,4-butylene terephthalate or a copolyester based on polyethylene terephthalate or poly-1,4-butylene terephthalate.

8. A moulding composition according to claim 5, wherein the reinforcing filler consists of glass fibers.

9. A moulding composition according to claim 5, which contains 5 to 40% by weight of calcined magnesium sulfate.

10. A moulding composition according to claim 5, which contains 5 to 40% by weight of calcined magnesium sulfate and 5 to 55% by weight of glass fibers.

* * * * *